June 28, 1960 J. R. McDOWELL 2,942,627
LAY MECHANISM
Filed April 1, 1957 3 Sheets-Sheet 2

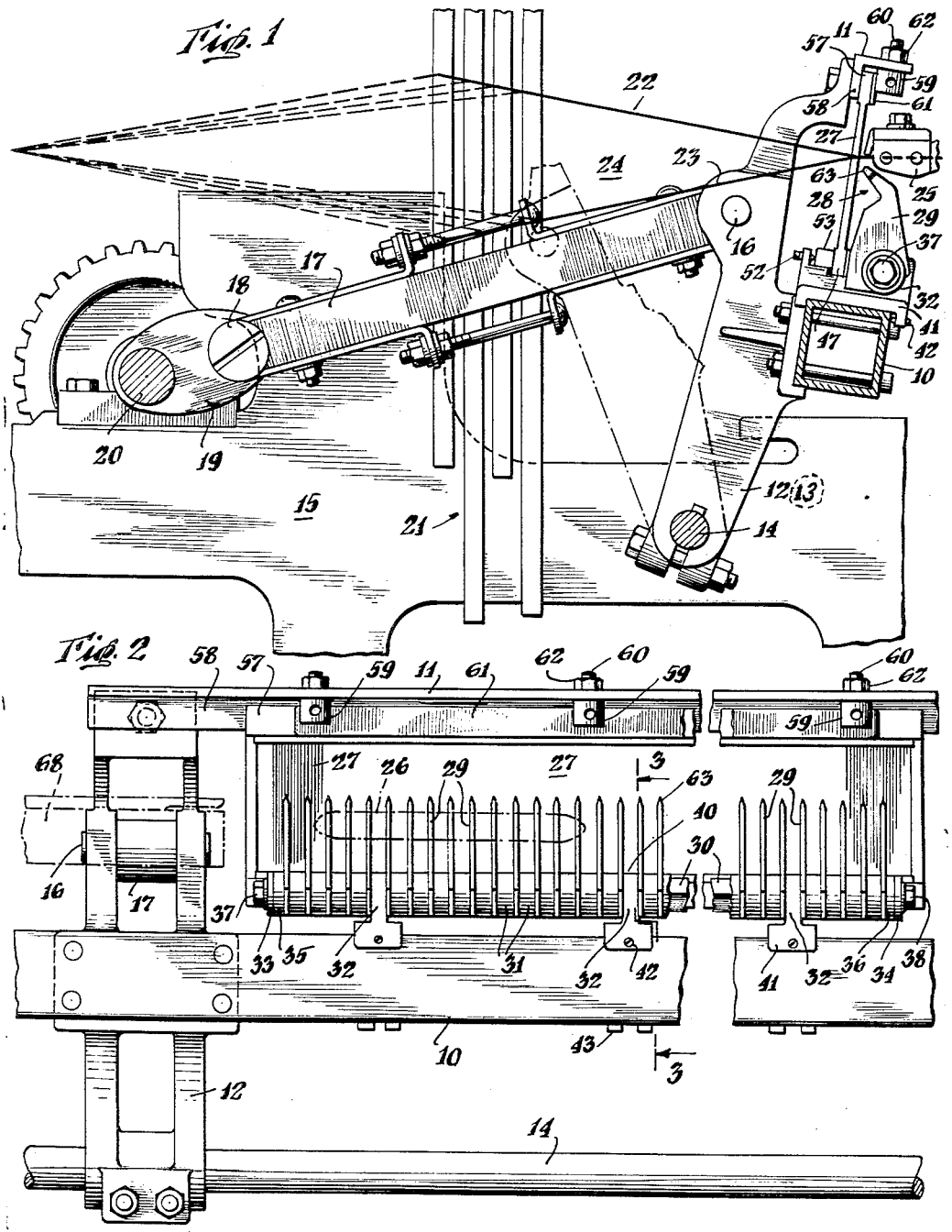

INVENTOR
John R. McDowell
BY
George F. DesMarais
ATTORNEY

June 28, 1960 J. R. McDOWELL 2,942,627
LAY MECHANISM
Filed April 1, 1957 3 Sheets-Sheet 3
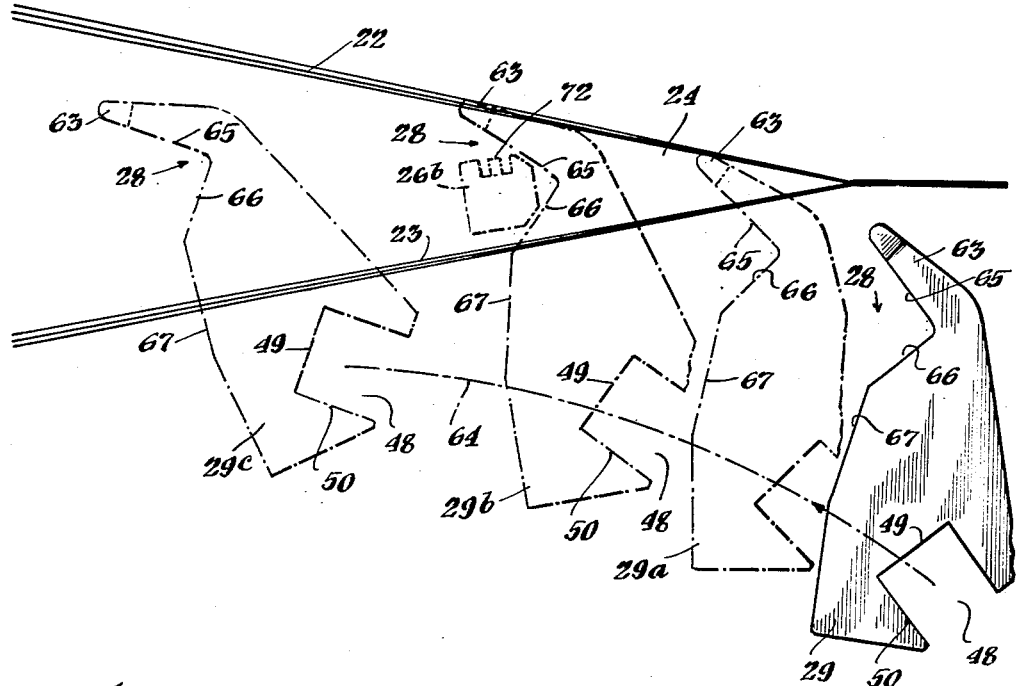
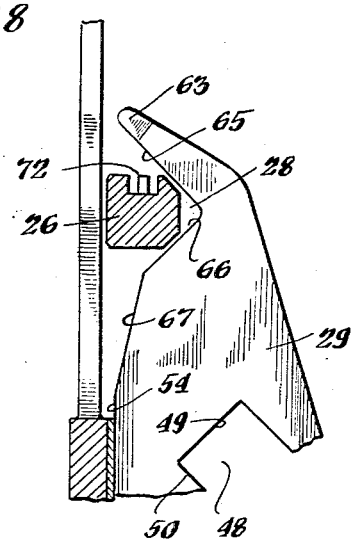
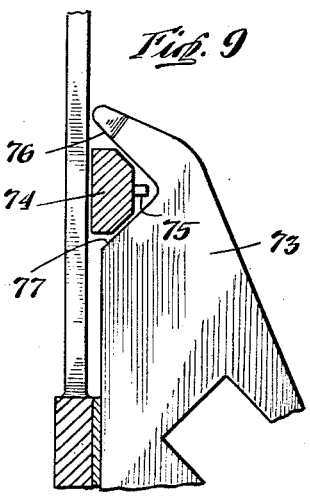
INVENTOR
John R. McDowell
BY
George F. DesMarais
ATTORNEY

United States Patent Office

2,942,627
Patented June 28, 1960

2,942,627
LAY MECHANISM

John R. McDowell, Knoxville, Tenn., assignor to George W. Dunham, Wilton, Conn.

Filed Apr. 1, 1957, Ser. No. 649,982

8 Claims. (Cl. 139—188)

This invention relates to looms and more particularly to a lay mechanism for guiding a filling thread carrier or pilot through a shed of warps. The lay mechanism includes a reed and an assembly of guides located in front of the reed and with each guide having a notch providing pilot-guiding surfaces which together with the front of the reed define a raceway for the pilot. An important feature of the invention resides in the outline provided for the guides whereby any edge thereof moving into and through a shed is never disposed at such an angle to a plane of warps as would cause an inordinate displacement of a warp from its plane.

In lay mechanisms theretofore employing notches in guides arranged perpendicularly to the face of the reed for guiding a filling thread carrier a warp crossing the plane of movement of a guide sometimes entered the notch of a guide and became stretched or broken as the guide moved backwardly. These undesirable results and also injury to the warps by a carrier in flight are avoided by the present invention wherein the guide notches are so arranged in the guides as to automatically eject any warp which might enter a notch without causing damage to the warp.

Another important feature of the invention resides in the manner and means by which a plurality of individual guides are assembled to a bar in wedged relationship therewith whereby like edges of the assembled guides are precisely located in common planes. The wedging action between the bar and the various guides is effected by clamping devices adapted to be mounted on a laybeam and which are also seized onto the bar by wedging actions whereby the clamping device, the bar and the guides are rigidly assembled as a unit.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part hereof, in which:

Fig. 1 is an elevational view showing a mounting for the lay mechanism of the present invention;

Fig. 2 is an elevational view of the mechanism shown in Fig. 1 as seen from the front of the loom;

Fig. 7 illustrates various positions of a guide in its arc of travel through an open shed;

Fig. 8 shows a pilot contained in a raceway formed according to the present invention; and Fig. 9 illustrates a modified form of guide for accommodating a pilot having thread grippers extending from a side surface.

Figure 3:
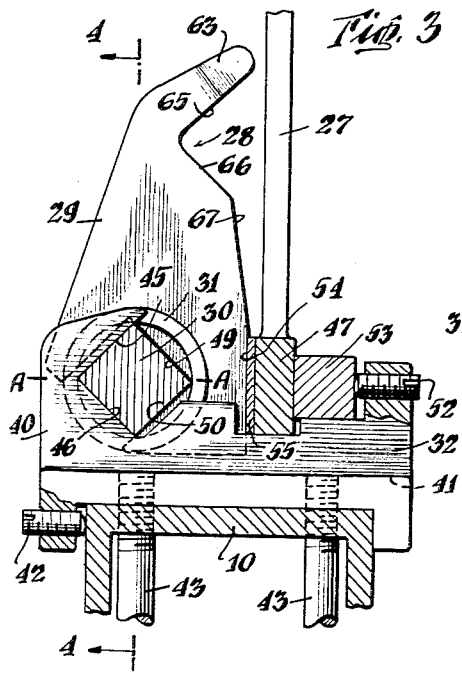
Fig. 3 is an enlarged cross-sectional view of part of the lay mechanism.

In the following description and in the claims, various details will be identified by specific names for convenience, but they are intended to be as generic in their application as the art will permit.

Like reference characters denote like parts in the several figures of the drawings.

In the drawing accompanying and forming part of this specification, certain specific disclosure of the invention is made for purposes of explanation, but it will be understood that the details may be modified in various respects without departure from the broad aspect of the invention.

Referring to Figs. 1 and 2, a laybeam 10 and a cap 11 are bolted to a pair of swords 12, 13, which are attached to a rockshaft 14. The rockshaft is journalled in the side frames of the loom, one of which is illustrated at 15, Fig. 1. Each of the lay swords carries a pin 16 to which a connecting rod 17 is connected. Each connecting rod is connected by a pin 18 to a crank 19 fast on a crankshaft 20 which is journalled in bearings mounted on the side frames of the loom.

As illustrated in Fig. 1, the laybeam is at its full front position and the crank is at zero position. The heddle frames 21 have moved the warps 22, 23, to form an open shed 24, and a filling thread has been beaten into the fell of the cloth just to the rear of the temples 25.

Figure 4:
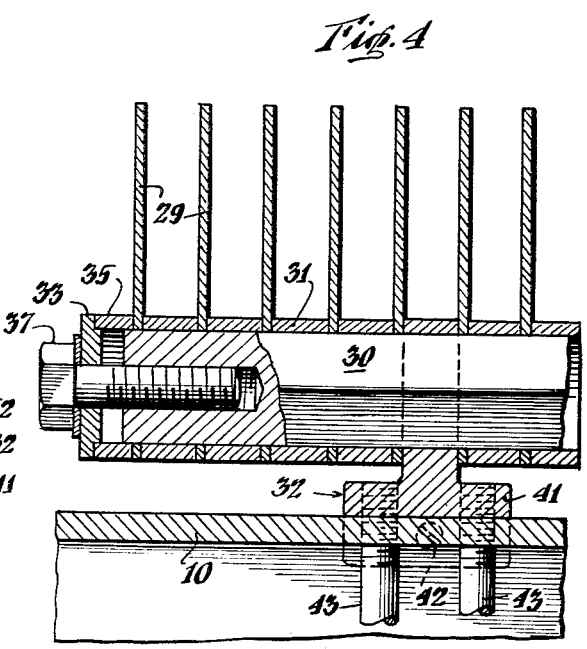
Fig. 4 is a section on line 4—4 of Fig. 3.

The raceway for guiding a filling thread carrier or gripper pilot 26 across the loom is located opposite the front of the reed 27 by aligned notches 28 in a series of plate-like members or pilot guides 29. As best seen in Figs. 2 and 4, the guides 29 are separated from each other by spacers alternately arranged with the guides along a bar 30. The bar 30 has four flat surfaces which are accurately finished to provide two wedges pointing in opposite directions. A bar having a square cross-section is economical to use and adequate to attain the justification required for the guides. The spacers comprise collars 31 and bracket members 32. The bracket members are adapted to be firmly abutted against two adjacent intersecting surfaces of the bar. The bracket members are used in sufficient numbers to secure the bar 30 and assembled guides and spacers to the laybeam 10.

The over-all lengthwise dimension of an assembled line of guides and spacers slightly exceeds the length of the bar 30. Washers 33 and 34 which bear upon the end collars 35 and 36 are spaced from the ends of the bar, as shown in Fig. 4. All of the guides and spacers have parallel side surfaces and are tightly pressed together when the bar is tensioned by the bolts 37 and 38. As will be explained hereinafter, the bolts are not tightened until after the guides and the spacers have been assembled on the bar 30 and the bracket members and guides have been pressed tightly into engagement therewith by forces acting from opposite directions parallel to the plane A—A of the bar, Fig. 6.

Each of the bracket members 32 has a central portion 40 upstanding from a base portion 41 having depending flanges and a set screw 42 for correctly locating a bracket member crosswise of the laybeam. The bracket members are secured to the laybeam by the bolts 43. The front end of the central portion 40 extends upwardly to above the center of the bar 30 and provides a projecting piece or lug at the front of the bar, as best seen in Fig. 3. The lug has two surfaces 45, 46, disposed at right angles to each other for engaging intersecting side surfaces of the square bar 30 whereby to support the bar with its side surfaces angularly disposed with reference to the plane of the reed. These surfaces 45 and 46 make angles of 45° with the upper face of the laybeam inasmuch as in the present embodiment of the invention the reed 27 is disposed perpendicularly to the upper face of the laybeam and the lower rail 47 of the reed is employed as an intermediary for applying force acting through the diagonal A—A of the bar for pressing the assembled bracket members 32 and guides 29 into engagement with the bar from opposite directions.

Each guide 29 has an opening 48 which provides two edges 49 and 50 disposed at right angles to each other for engaging the intersecting adjacent surfaces of the bar 30 which are nearest the reed. The arrangement is such that the bar 30 and the guide plates 29 are wedged tightly together by the clamping action of the bracket members 32 and set screws 52.

The lower rail 47 of the reed rests on the bracket members and is clamped in position by the set screws 52 engaged in tapped holes in the bracket members and contacting a reed supporting bar 53 which lies against the back face of the lower rail 47. The front face of the lower rail 47 may press directly upon the rear vertical edges 54 of the aligned guides or against a reed spacing strip 55 as shown in Fig. 3. The strip 55 is preferably constituted of relatively soft metal or other form of moderately compressible material thereby to assure that the angled edges 49 and 50 of each of the guides are tightly engaged with the bar 30.

The upper rail 57 of the reed (Figs. 1 and 2) is clamped against the depending flange 58 of the cap 11 by a plurality of reed locks, each comprising a cylinder 59 having an eccentrically located pin 60 supported in a hole in the horizontal flange of the cap. The cylinder is held in clamping position against a shim 61 by a locking nut 62 tightened on the threaded end of the pin 60.

The assembled lay mechanism affords a rigid relationship between the reed and the guides whereby the reed and the guides together provide a raceway of uniform cross-sectional dimensions throughout its length.

The guides illustrated in the drawing are cut from flat sheets of a durable material such as steel and their edges are rounded. They have a common outline or pattern so that like edges of the respective guides are aligned in a common plane when a string of guides is assembled on the bar 30. The upper end of each guide is in the form of a finger 63, tapered at its end for parting adjacent warps.

As may be seen in Fig. 7, the guides 29 rise in an ascending arc 64 as they move into the shed. The guide 29 is there illustrated in a position corresponding to the full front position of the lay, and instantaneous positions of a guide are indicated at 29a, 29b and 29c corresponding to positions of the lay at approximately 53°, 90° and 180°, respectively. In a conventional loom cycle the shed is fully open at the full front position of the lay and remains open until it starts to close at the 180° position of the crank 19. At approximately 270° the shed is fully closed and starts to open with the warps reversed, and becomes fully open at 360° or at the full front position of the lay.

Each of the pilot-guiding members or guides 29 moves in a plane normal to the pivotal axis of the lay and normal to the planes of the warps. If all of the warps in a common plane were perfectly parallel to each other and also parallel to the planes of the several guides, none of the warps would cross a plane of a guide. In practice absolute parallelism at all times is very difficult to attain. Some or all of the warps may be oblique to the planes of the guides. Moreover, in weaving a wide cloth, for example, selvage warps are commonly spaced a greater distance apart at the reed than at the fell of the cloth with the result that many of the warps are angled or slanted in their respective planes with respect to the vertical planes of the guides. It follows from this that a warp extending obliquely or slanting from any cause is likely to cross or intersect the plane of a guide adjacent thereto as the lay reciprocates. A warp which crosses the vertical plane of travel of a guide is susceptible to abrasion, stretching or breaking if one or another edge of a guide either lifts a warp from its normal plane as the guide rises and moves backwardly into a shed, or pulls a warp downwardly from its normal plane as the guide moves forwardly on the return stroke. In the guide of the present invention all of the edges of each guide which move through the warps are so inclined in the vertical plane of the guide as to plow through and thus avoid picking up (vertically displacing) warps crossing or intersecting the path of movement of a guide. The edges 65 and 66 of the notch 28 provide surfaces for guiding the pilot in its flight. These edges are so disposed in the guide as always to make an angle with the lower plane of warps in excess of the maximum angle at which a warp may repose on either edge and be moved vertically by the guide as the guide moves through a shed.

In entering the shed the tapered end of the finger 63 parts adjacent warps 23. If any of such warps cross the plane of a guide in advance of the finger 63 and are caused to enter a guide notch, their crossing point will be advanced ahead of the finger or towards the left in Fig. 7 owing to the slope of the edge 65 with respect to the plane of the lower warps 23. The crossing point of the crossing warps will be further advanced along the plane of the warps by the edge 66 as this edge moves through the plane of the warps in approaching the position of the guide indicated at 29b. When the guide has moved to the position 29b, the parting or clearing action of the guide on the warps is transferred from the edge 66 to the edge 67 which continues the parting action as the guide moves to its full back position at 29c. The pilot is projected into the raceway from a projecting box 68 at the end of the lay at about the time the guides have arrived at the position 29b, or soon after the raceway defined by the guiding surfaces 65 and 66 has cleared the lower warps.

While the edges 65 and 66 are preferably disposed at right angles to each other and at angles of 45 degrees with the plane of the reed, some variation in the open angle which is thereby provided is permissible so long as the edges of the guide notches cooperate with the warps in the manner described. It is apparent from a study of the action illustrated in Fig. 7 that the principle involved prescribes that no edge of a guide is ever disposed at such a low angle with respect to the plane of the warps 23 as to pick up or snag or inordinately displace a warp from its plane, and that any warp which may enter a guide notch is automatically ejected from the path of the pilot as the lay and guides swing backwardly.

Figure 5:
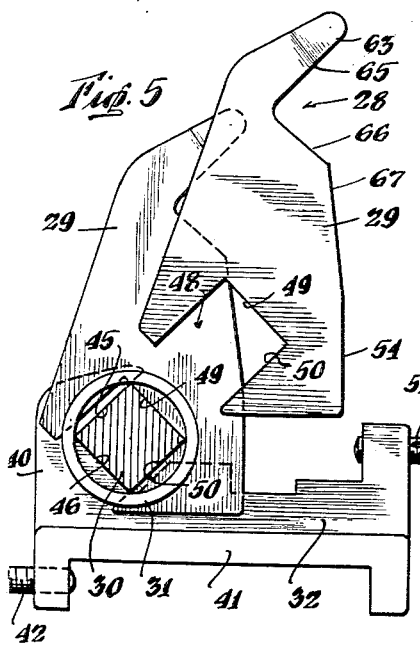
Fig. 5 illustrates a stage in the assembling of a series of guides.
Figure 6:
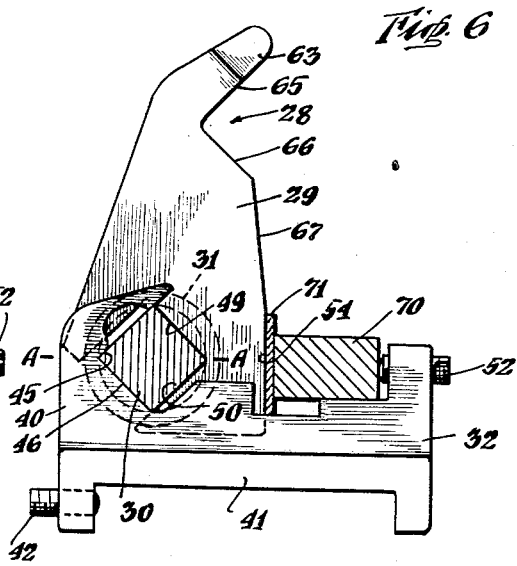
Fig. 6 illustrates the manner in which guides are wedged upon a supporting bar.

In assembling the guides a selected number of guides, collars and bracket members are placed onto the bar 30 with the edges 45 and 46 of the bracket members disposed opposite to the edges 49 and 50, respectively, of the guides in the manner illustrated in Fig. 5. As illustrated in Fig. 6, a bar 70 and a strip 71 of softer material are then placed between the back edges 54 of the guides and the set screws 52. The set screws are tightened to assure that the edges 45 and 46 of the bracket member and the edges 49 and 50 of the guides abut in firm engagement with the bar 30. When this is accomplished, the bolts 37 and 38 are tightened to hold all the guides aligned along the bar. The complete assembly is then ready for mounting on the laybeam as a unit. When properly placed on the laybeam the set screws 42 are tightened and the temporary members 70 and 71 are replaced by the lower rail 47 of the reed, the supporting bar 53 and the strip 55, as shown in Fig. 3.

The pilot is an elongated body having grippers 72 adjacent each end for picking up filling threads supplied from opposite ends of the laybeam. As shown in Fig. 8, the pilot has three flat side faces, one for sliding over the front of the reed and two respectively facing the guiding surfaces 65 and 66. The surfaces 65 and 66 prevent the pilot from moving in any direction laterally from the reed.

Modified forms of a guide 73 and of a pilot 74 are shown in Fig. 9. In this pilot, the grippers 75 for the filling thread extend into the space adjacent the apex of the angle formed by the guiding surfaces 76 and 77.

The application and use of the invention will be apparent to those skilled in the art in view of the foregoing disclosure. While an apparatus has been described which is presently considered to represent the best mode of carrying out the invention, it is to be understood that various features and elements in the combinations and relationships involved may be altered and others omitted without departing from the scope of the invention privileged by the appended claims.

What is claimed is:

1. In a loom, a laybeam pivoted to swing between front and back positions, and guide means for directing the course of a filling thread carrier through a shed of warps, said guide means comprising a reed and a series of flat plates, the several plates of said series being disposed at right angles to said reed and spaced from each other in a line along said laybeam, each of said plates having an open angle notch opening towards the front of the reed and formed by two straight edges diverging to form an open mouth therebetween at the back of said plate, each of said straight edges being so disposed in said plate as to always make an angle with the lower plane of said shed in excess of the maximum angle at which a warp may repose on said straight edges as they are moved through a shed, and means supporting said plates on said laybeam in front of said reed to effect with said reed a raceway having three carrier-guiding planes comprising the front of said reed and said straight edges of said open-angle notches.

2. In a loom having a reciprocating laybeam and a reed, the combination of a raceway formed in part by said reed and in part by the edges of aligned notches in a plurality of similar plate-like guide members arranged at intervals in a line parallel to and in front of said reed with each of said guide members disposed at right angles to said reed, each of said notches being V-shaped and opening toward said reed, the edges of said notches defining two guiding planes for said raceway, each guiding plane disposed angularly with reference to said reed and thereby defining with said reed a triangular cross-section for said raceway wherein said reed and said edges of said notches provide guiding surfaces for a filling thread carrier, a bar extending parallel to said line of guide members and engaging an opening in each of said members, means clamping said members onto said bar, and means for detachably mounting said bar, guide members and clamping means as an assembled unit on said laybeam.

3. In a loom, a laybeam, and guide means for directing the course of a filling thread carrier through a shed of warps, said guide means comprising a reed and a series of flat plates, the several plates of said series being disposed at right angles to said reed and spaced from each other in a line along said laybeam, each of said plates having an open-angle notch opening towards the front of the reed and defined by two edges forming an angle of the order of 90°, each of said edges sloping at angles of 45° with respect to the front of the reed and thereby defining two walls of a raceway for containing the course of said carrier, said reed defining a third wall for said raceway, and means supporting said plates on said laybeam in front of said reed to effect with said reed three carrier-guiding planes comprising the front of said reed and said two edges of said open-angle notches.

4. In a loom, a laybeam pivoted to swing between front and back positions, a lay mechanism mounted on said lay, said lay mechanism comprising a reed having upper and lower rails, a bar disposed forwardly of and parallel to said lower rail, said bar having two pairs of flat side surfaces forming a pair of wedges having a common medial plane substantially normal to the plane of said reed, one of said wedges pointed toward said lower rail and the second of said wedges pointed away from said lower rail, pilot-guiding members arranged in spaced relationship in front of said reed, each of said members constituted of a plate perpendicular to said bar and to said reed, each plate having a base portion between said reed and said bar and a notch with angled edges for engaging said first-described wedge of said bar, spacing elements mounted on said bar and separating individual ones of said pilot-guiding members from each other, certain of said spacing elements comprising a plurality of bracket members, each bracket member having angularly disposed surfaces for engaging said second-described wedge of said bar, a reed-supporting bar disposed along the back of said lower rail and adjustable force-applying devices acting between said reed-supporting bar and said bracket members whereby said pilot-guiding members are held in engagement with said first-described wedge and said bracket members are held in engagement with said second-described wedge by forces acting in opposite directions on said first-named bar.

5. A loom lay mechanism comprising a laybeam, a bar having a square cross-section, a plurality of brackets for supporting said bar on said laybeam with the diagonals of its square cross-section extending vertically and horizontally, respectively, with respect to said laybeam and brackets whereby said bar has two of its side surfaces inclined towards an apex at the forward end of said horizontal diagonal and the other two of its side surfaces inclined towards an apex at the rearward end of said horizontal diagonal, each of said brackets having a base portion with its longest dimension extending transversely to and beneath said bar and substantially parallel to the horizontal diagonal of said bar, said bracket having a lug upwardly extending from adjacent the front end of said base portion, said lug having a pair of flat surfaces disposed perpendicularly to each other for engaging the adjacent side surfaces of said bar which incline towards the forward end of said horizontal diagonal, a series of plate-like members separated from one another and arranged in a line one after another along said bar, said plate-like members having notches for guiding a filling carrier, each of said plate-like members having a pair of edges disposed perpendicular to each other for engaging the adjacent side surfaces of said bar which incline towards the rearward end of said horizontal diagonal, and means for maintaining said angularly disposed flat surfaces on said lug and said pair of angularly disposed edges of said plate members in engagement with said bar, said means comprising a member engaging said series of plate members, and screws carried by said bracket and adjustable for tightly clamping said first-named bar between said lugs and said series of plate-like members.

6. A loom lay mechanism comprising a laybeam, a series of plate-like members separated from one another and arranged in a line parallel to said laybeam, said members being disposed in planes transverse to said laybeam with front edges facing forwardly of said laybeam and back edges facing rearwardly of said laybeam, said back edges including aligned notches for guiding a filling carrier, means for rigidly supporting said series of plate-like members on said laybeam, said supporting means comprising a bar having a square cross-section providing four flat side surfaces, a plurality of brackets adapted for attachment to said laybeam, each of said brackets having a base portion with its longest direction extending transversely to and beneath said bar, said bracket having a lug upwardly extending from adjacent the front end of said base portion, said lug having a pair of flat surfaces perpendicular to one another and sloped at angles of 45° with respect to said longest direction of said bracket for engaging a pair of said side surfaces of said bar which converge toward the front end of said bracket, each of said plate-like members having a pair of edges disposed perpendicularly to one another and at angles of 45° with the longest dimension of said bracket for engaging the remaining pair of said side surfaces of said bar which converge toward the back end of said bracket, and means for clamping said bar between said pair of flat surfaces on said lug and said pair of edges on said plate-like member, said clamping means comprising set screws mounted adjacent the back end of said brackets and force-transmitting means between said set screws and the back edges of said plate-like members.

7. In a loom, a pivoted lay carrying a raceway defined in part by a reed and in part by edges of notches in a series of plates mounted on said lay and disposed in planes substantially normal to said reed and parallel to the plane of movement of the lay, said edges in each of said plates diverging from one another toward said reed and disposed in each plate in such directions that they eject from said notches such warps which enter any of the notches as said notches pass through a plane of warps as said lay reciprocates, whereby warps extending obliquely of the plane of one or another of said plates are not liable to become snagged in said notches as said plates move through and along the warps.

8. In a loom, a laybeam, a reed, means for directing the course of a weft carrier along the front face of said reed, said means comprising edges of notches in guides disposed in planes substantially perpendicular to said reed and spacially arranged along the front face of said reed, said notches moving from and to below the lowermost plane of warps, into and out of sheds formed by warps as said laybeam reciprocates, edges of each of said notches diverging from one another toward said reed and so disposed as always to incline in respect to the planes of the warps as the edges move through and along the warps whereby any warps which enter said notches are caused to slide relatively to said edges and be expelled from said notches as the laybeam moves forwardly and rearwardly.

References Cited in the file of this patent
UNITED STATES PATENTS

| | | |
|---|---|---|
| 2,538,630 | Rusnov | Jan. 16, 1951 |
| 2,675,027 | Wakefield | Apr. 13, 1954 |
| 2,793,658 | Dunham | May 28, 1957 |
| 2,833,315 | Dunham | May 6, 1958 |